United States Patent
Hernando

(10) Patent No.: US 10,284,280 B2
(45) Date of Patent: May 7, 2019

(54) METHOD, SYSTEM AND DEVICE FOR COMPENSATION OF DOPPLER IMPAIRMENTS IN OFDM WIRELESS COMMUNICATION NETWORKS

(71) Applicant: Telefonica, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 15/810,588

(22) Filed: Nov. 13, 2017

(65) Prior Publication Data
US 2018/0138963 A1    May 17, 2018

(30) Foreign Application Priority Data
Nov. 14, 2016  (EP) .................................... 16382529

(51) Int. Cl.
| | | |
|---|---|---|
| H04B 7/08 | (2006.01) | |
| H04B 7/0408 | (2017.01) | |
| H04B 7/0413 | (2017.01) | |
| H04L 5/00 | (2006.01) | |
| H04B 7/0452 | (2017.01) | |
| H04L 27/26 | (2006.01) | |

(52) U.S. Cl.
CPC ........... *H04B 7/086* (2013.01); *H04B 7/0408* (2013.01); *H04B 7/0413* (2013.01); *H04B 7/0452* (2013.01); *H04B 7/08* (2013.01); *H04L 5/001* (2013.01); *H04L 27/2657* (2013.01); *H04L 27/2684* (2013.01)

(58) Field of Classification Search
CPC .... H04B 7/086; H04B 7/0408; H04B 7/0413; H04B 7/0452; H04B 7/08; H04L 5/001; H04L 27/2657; H04L 27/2684
See application file for complete search history.

(56) References Cited

U.S. PATENT DOCUMENTS

| | | | |
|---|---|---|---|
| 2014/0348255 A1* | 11/2014 | Hernando | ............ H04B 7/0452 375/267 |
| 2018/0083719 A1* | 3/2018 | Kim | ......................... H04B 7/04 |

FOREIGN PATENT DOCUMENTS

| | | |
|---|---|---|
| EP | 2806576 A1 | 11/2014 |
| EP | 3038270 A1 | 6/2016 |
| WO | 2016153265 A1 | 9/2016 |

OTHER PUBLICATIONS

Fan, Dian et al. "Doppler shift estimation for high-speed railway wireless communication systems with large-scale linear antennas", 2015 International Workshop on High Mobility Wireless Communications, Oct. 21, 2015, pp. 96-100, IEEE.

Schmidl et al. "Robust Frequency and Timing Synchronization for OFDM", IEEE Transactions on Communications, Dec. 1997, pp. 1613-1621, vol. 45, No. 12, IEEE.

(Continued)

*Primary Examiner* — Jaison Joseph
(74) *Attorney, Agent, or Firm* — Ohlandt, Greeley, Ruggiero & Perle, L.L.P.

(57) ABSTRACT

A system, method and device to overcome the effects of mobility in OFDM wireless cellular networks. Individual beams are isolated and Doppler impairments are compensated so the constituent beams can reach the users in DL with ideally no Doppler impairments. Similarly in UL the signals corresponding to the different spatial beams are detected and their Doppler impairments compensated.

14 Claims, 5 Drawing Sheets

(56) References Cited

OTHER PUBLICATIONS

Van de Beek et al. "ML Estimation of Time and Frequency Offset in OFDM Systems", IEEE Transactions on Signal Processing, Jul. 1997, pp. 1800-1805, vol. 45, No. 7, IEEE.
Marzetta "Noncooperative Cellular Wireless with Unlimited Number of Base Station Antennas", IEEE Transactions on Wireless Communications, Nov. 2010, pp. 3590-3600, vol. 9, No. 11, IEEE.
European Search Report for the corresponding international application EP16382529.2, dated May 18, 2017, 9 pages.

* cited by examiner

METHOD, SYSTEM AND DEVICE FOR COMPENSATION OF DOPPLER IMPAIRMENTS IN OFDM WIRELESS COMMUNICATION NETWORKS

FIELD OF THE DISCLOSURE

The present disclosure has its application within the telecommunication sector, especially, deals with the Doppler impairments caused by user mobility in Orthogonal Frequency-Division Multiplexing (OFDM) wireless communication systems. More specifically, the present disclosure proposes a method, a system and a device to compensate (at the base station side) the Doppler impairments introduced by user mobility in OFDM wireless cellular networks.

BACKGROUND OF THE DISCLOSURE

LTE (Long Term Evolution) is the next step in cellular Third-Generation (3G) systems, which represents basically an evolution of previous mobile communications standards such as Universal Mobile Telecommunication System (UMTS) and Global System for Mobile Communications (GSM). It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth. In order to do that, LTE uses Orthogonal Frequency-Division Multiple Access (OFDMA) which is a proven access technique, based on Orthogonal Frequency-Division Multiplexing (OFDM). Other wireless standards like WiFi (IEEE 802.11) or WiMAX (IEEE 802.16) also employ OFDM techniques.

The use of OFDM techniques allow efficient user and data multiplexing in the frequency domain and have many other advantages (for example its ability to resolve the frequency components of the received signal). However, OFDM is highly sensitive to frequency misalignments as well as to Doppler impairments caused by user mobility. Compensation of impairments caused by user speed is of increased importance in wireless cellular systems, particularly in systems employing high carrier frequencies for which Doppler impairments can be very significant. The impact of mobility of the user and/or the environment linearly increases with the carrier frequency. In addition, mobile devices are usually equipped with omni-directional antennas (or present very limited beamforming capabilities), and chances are high that signals are received over a relatively wide angular region. This fact, together with the existence of multipath, transforms Doppler shifts into Doppler spreads which are much more difficult to compensate at the receive side.

Moreover, massive Multiple Input Multiple Output (Massive MIMO) techniques are of increased interest in order to enhance the spectral efficiency per unit area. Massive MIMO (also known as Large-Scale Antenna Systems, Very Large MIMO, Hyper MIMO, Full-Dimension MIMO . . . ) tries to spatially multiplex several users in the same time-frequency resources, thanks to the extra degrees of freedom provided by the high number of antennas at the base station, by employing linear precoding techniques. Extra antennas help by focusing energy into ever-smaller regions of space to bring huge improvements in throughput and radiated energy efficiency. Other benefits of massive MIMO include the extensive use of inexpensive low-power components, reduced latency, simplification of the media access control (MAC) layer, and robustness to intentional jamming. There is currently no definition of how many antennas a system must have to be considered Massive MIMO, but a system with greater than 64 antennas is generally considered a Massive MIMO system.

However, massive MIMO systems and traditional cellular systems can greatly suffer from user mobility if OFDM is employed. Doppler impairments give rise to inter-carrier interference and channel estimation impairments, which can be compensated by prior art techniques only up to a certain user speed determined by the actual OFDM frame structure and numerology.

The usual approach when coping with Doppler impairments in OFDM is to estimate the time-domain and frequency-domain channel variations at the receiver side by means of in-band pilots, conveniently interspersed with data subcarriers. Pure Doppler shifts are much easier to compensate than Doppler spreads (due to multipath), the latter demanding adaptive equalization techniques that are upper-limited by the rate of variation of the channel. In addition, equalization is only effective up to a certain user speed above which the channel is no longer constant along the duration of an OFDM symbol.

The subcarrier width can be increased when trying to cope with systems with large Doppler impairments, but this leads to shorter OFDM symbol durations. This is typically interesting when the system bandwidth is large (e.g. as foreseen in millimeter-wave bands, with up to several GHz potentially available for cellular use). If this is not the case, increasing the subcarrier width is not a valid option.

More adequate and effective solutions to compensate Doppler impairments are therefore highly desirable in order to overcome (or at least minimize) the impact of mobility in wireless OFDM cellular networks.

SUMMARY

The present disclosure solves the aforementioned problems and overcomes previously explained state-of-the-art limitations by proposing a new method to compensate the effects of Doppler impairments in wireless Orthogonal Frequency-Division Multiplexing (OFDM) networks and more specifically in OFDM cellular networks.

In a basic scenario of application of the present disclosure, M moving cellular users (or more specifically M user equipments, also called user stations) are wirelessly connected (communicated) to a base station, comprising a rectangular array of $N_1 \times N_2$ transmission/reception antennas (where $N_1$ and $N_2$ are the number of antennas in the horizontal and vertical direction, respectively) in a MIMO (multiple input-multiple output) system, preferably a massive MIMO system. In the present disclosure, Doppler impairments caused by user speeds are compensated in both uplink (UL) and downlink (DL) directions. To that end, according to an embodiment of the present disclosure, the base station continuously senses the channel in uplink direction and preferably performs a technique to spatially separate the received beams corresponding to the different users according to their angles of arrival. Any known technique can be used to spatially separate the received beams according to their angles of arrival, for example the techniques proposed in patent applications EP-A1-2806576 and EP-A1-3038270.

In an embodiment of the present disclosure it is proposed a method, system and device to compensate Doppler impairments in wireless OFDM cellular systems, comprising at least one base station equipped with a rectangular antenna array of $N_1 \times N_2$ antennas with inter-antenna spacing $d_x$, $d_y$ in horizontal and vertical direction respectively and at least one user device (user equipment) moving at a certain speed (generally speaking there will be M moving cellular users M>=1) hence introducing Doppler impairments in uplink and downlink directions. Usually, said at least one base station will have a sufficiently high number of antennas so as to be able to spatially resolve the individual constituent beams of the received signals according to their angles of arrival. In order to compensate Doppler impairments in uplink and downlink the base station may perform the following steps:

- detecting (separating) uplink individual beams (comprising the signals received in uplink affected by Doppler impairments). This may be made thanks to the angular resolution provided by the large number of antennas. After this, for each user, it is determined, from the detected beams, the set of angular directions (spatial beams) of interests (usually, beams on which non-zero signal energy is received for said user).
- estimating the Doppler shifts characterizing the individual beams of said uplink signals (taking advantage of the small Doppler spread that is expected in beams having sufficiently narrow beam widths);
- intentionally introducing Doppler shifts equal to the opposite of said estimated Doppler shifts to the individual beams received in uplink direction, in order to effectively compensate Doppler impairments in uplink;

Additionally, it may be also applied in the downlink by:

- decomposing the signals to be transmitted in downlink direction into a set of individual downlink beams (thanks to the angular resolution provided by the large number of antennas); and
- intentionally introducing Doppler shifts equal to the opposite of said estimated Doppler shifts to the individual beams to be transmitted in downlink direction, in order to effectively compensate Doppler impairments in downlink.

The proposed method can be applied even when the base station has no previous information on the channel characteristics between it and some or all of the M user equipments.

In an embodiment, upon reception at the antenna element (n, m) of the time-domain signals ($A_R[n, m, t]$), where n and m are integer indices labelling the antennas in the horizontal and vertical direction respectively (n=0, ..., $N_1-1$, m=0, ..., $N_2-1$) the frequency components $S_R[k, l, f]$ at the spatial beam in the (k, l) direction can be obtained by means of the following expression (this can be obtained, for example, from known training or pilot signals transmitted by each one of the users):

$$S_R[k, l, f] = \frac{1}{\sqrt{N_c N_1 N_2}} \sum_{t=0}^{N_c-1} \sum_{n=0}^{N_1-1} \sum_{m=0}^{N_2-1} A_R[n, m, t] \exp\left(-j\frac{2\pi}{N_c}ft\right)\exp\left(j\frac{2\pi}{N_1}nk\right)\exp\left(j\frac{2\pi}{N_2}ml\right)$$

where $N_c$ is the number of OFDM subcarriers in the frequency domain, and f may be discretized for each subcarrier, taking the values f=0, ..., $N_c-1$.

At this state, beams in the spatial domain that create inter-user interference may be discarded (in order to do this, any known technique can be used, for example the techniques proposed in patent application EP-A1-2806576). Then, the base station can estimate the Doppler shifts corresponding to the remaining spatial beams (this estimation is more accurate if the number of antennas is sufficiently high so that the resulting beam widths are very small). Doppler shifts at the spatial beam in the (k, l) direction can in general be written as:

$$f_{d,shift}[k,l] = f_{d,shift}^{coarse}[k,l] + f_{d,shift}^{fine}[k,l],$$

wherein a coarse Doppler shift component $f_{d,shift}^{coarse}[k, l]$ comprises an integer number of subcarriers (multiple of the subcarrier width), which can be estimated through observation of the relative position of known pilot subcarriers, and a fine Doppler shift component $f_{d,shift}^{fine}[k, l]$ comprising a fraction of the subcarrier width $\Delta f$ which can be estimated through time-domain correlations involving the cyclic prefix or other any a-priori known symbol sequence, not precluding other estimation methods from prior art. Both terms can thus be conveniently estimated (e.g. at the base station side) by known using prior art techniques.

Said intentional Doppler shifts can be introduced in order to compensate Doppler impairments in uplink by applying the following expression:

$$S_R[k, l, t] = S_{R,Dopp}[k, l, t]\exp\left(-j2\pi\frac{f_{d,shift}[k, l]}{\Delta f}t\right),$$

where $S_{R,Dopp}[k, l, t]$ denotes the Doppler-affected discrete-time samples of the received OFDM symbol at the base station; $S_R[k, l, t]$ are the corresponding samples of the received OFDM symbol at the base station after introducing said intentional Doppler shift (ideally without Doppler impairments); $\Delta f$ is the subcarrier width; and $f_{d,shift}[k, l]$ is the estimated Doppler shift of the beam (uplink beam) characterized by coordinates (k, l) in the (u, v) grid.

The M user equipments are characterized by elevation and azimuth angles (θ, φ) in a spherical coordinate system discretized through a grid spacing $\Delta u$, $\Delta v$ in an (u, v) domain where $$u = \sin(\theta)\cos(\varphi)$$

$$v = \sin(\theta)\sin(\varphi)$$

and (k, l) are indices characterising the spatial beams in an (u, v) grid according to the following relations:

$$u_k = k \cdot \Delta u; k = 0, 1, \ldots, N_1 - 1$$
$$v_l = l \cdot \Delta v; l = 0, 1, \ldots, N_2 - 1.$$
$$d_x = \frac{\lambda}{N_1 \Delta u}$$
$$d_y = \frac{\lambda}{N_2 \Delta v}.$$

where $\lambda$ is the wavelength of a system operating frequency.

Taking all above into account, said individual beams affected by Doppler impairments may be detected in uplink direction by means of the following expression:

$$S_{R,Dopp}[k, l, t] = \frac{1}{\sqrt{N_1 N_2}} \sum_{n=0}^{N_1-1} \sum_{m=0}^{N_2-1} A_R[n, m, t]\exp\left(j\frac{2\pi}{N_1}nk\right)\exp\left(j\frac{2\pi}{N_2}ml\right).$$

In the downlink direction, it is also possible to ideally compensate Doppler effects by introducing intentional Doppler shifts on the signals to be transmitted.

The signals to be transmitted in downlink direction may be decomposed into a set of individual beams in the frequency domain by means of the following expression:

$$A_T[n, m, f] = \sqrt{\frac{1}{N_1 N_2}} \sum_{k=0}^{N_1-1} \sum_{l=0}^{N_2-1} P_T[k, l] S_T[k, l, f] \exp\left(-j\frac{2\pi}{N_1}nk\right) \exp\left(-j\frac{2\pi}{N_2}ml\right),$$

with $f = 0, \ldots, N_c - 1$, where $A_T[n, m, f]$ are the frequency-domain OFDM transmit signals corresponding to each antenna element (n, m); $P_T[k, l]$ are the individual transmit powers assigned to beams (k, l); and $S_T[k, l, f]$ are the frequency-domain normalized (unit power) complex baseband signals to be sent to user equipment i over the spatial beams (k, l).

Said intentional Doppler shifts in downlink are introduced by using the following equation:

$$A_T[n, m, t] = \sqrt{\frac{1}{N_1 N_2}} \sum_{k=0}^{N_1-1} \sum_{l=0}^{N_2-1} P_T[k, l] S_T[k, l, t] \times \exp\left(-j2\pi\frac{f_{d,shift}[k, l]}{\Delta f}t\right) \exp\left(-j\frac{2\pi}{N_1}nk\right) \exp\left(-j\frac{2\pi}{N_2}ml\right),$$

where $A_T[n, m, t]$ are the time-domain OFDM transmit signals corresponding to antenna element (n, m) which compensate Doppler impairments in downlink; $\Delta f$ is the subcarrier width; $S_T[k, l, t]$ is the time-domain OFDM transmission signal corresponding to spatial beam with coordinates (k, l) in the (u, v) grid; and $f_{d,shift}[k, l]$ is the Doppler shift of the beam with coordinates (k, l) as estimated in uplink direction.

Each of the signal beams is in general affected by Doppler in a seemingly unpredictable way. However, given that the spatial beams are characterized by narrow beam widths according to the large number of base station antennas, Doppler effects are much more easily overcome by individually compensating the Doppler shifts associated to each of the beams.

The present disclosure can be applied in either Time Division Duplex (TDD) or Frequency Division Duplex (FDD) because, contrary to other massive MIMO techniques, the spatial multiplexing of beams (for example, as proposed in patent applications EP-A1-2806576 or EP-A1-3038270) does not require full channel knowledge at the base station side.

According to other aspects of the disclosure, the present disclosure proposes a system and a base station with means for performing the steps of the method previously disclosed.

In a last aspect of the present disclosure, a computer program is disclosed, comprising computer program code means adapted to perform the steps of the described method, when said program is run on processing means of a network entity of an OFDM network, said processing means being for example a computer, a digital signal processor, a field-programmable gate array (FPGA), an application-specific integrated circuit (ASIC), a micro-processor, a micro-controller, or any other form of programmable hardware. A non-transitory digital data storage medium is also provided for storing a computer program comprising instructions, causing a computer executing the program to perform all steps of the disclosed methods when the program is run on a computer.

Consequently, according to the disclosure, a method, system, device and storage medium according to the independent claims are provided. Favourable embodiments are defined in the dependent claims.

These and other aspects and advantages of the disclosure will be apparent from and elucidated with reference to the embodiments described hereinafter.

BRIEF DESCRIPTION OF THE DRAWINGS

For the purpose of aiding the understanding of the characteristics of the disclosure, according to a preferred practical embodiment thereof and in order to complement this description, the following figures are attached as an integral part thereof, having an illustrative and non-limiting character.

DETAILED DESCRIPTION OF THE PREFERRED EMBODIMENT

The present disclosure proposes a method, system and device to compensate the effects of Doppler impairments in wireless OFDM communications systems.

Figure 1:
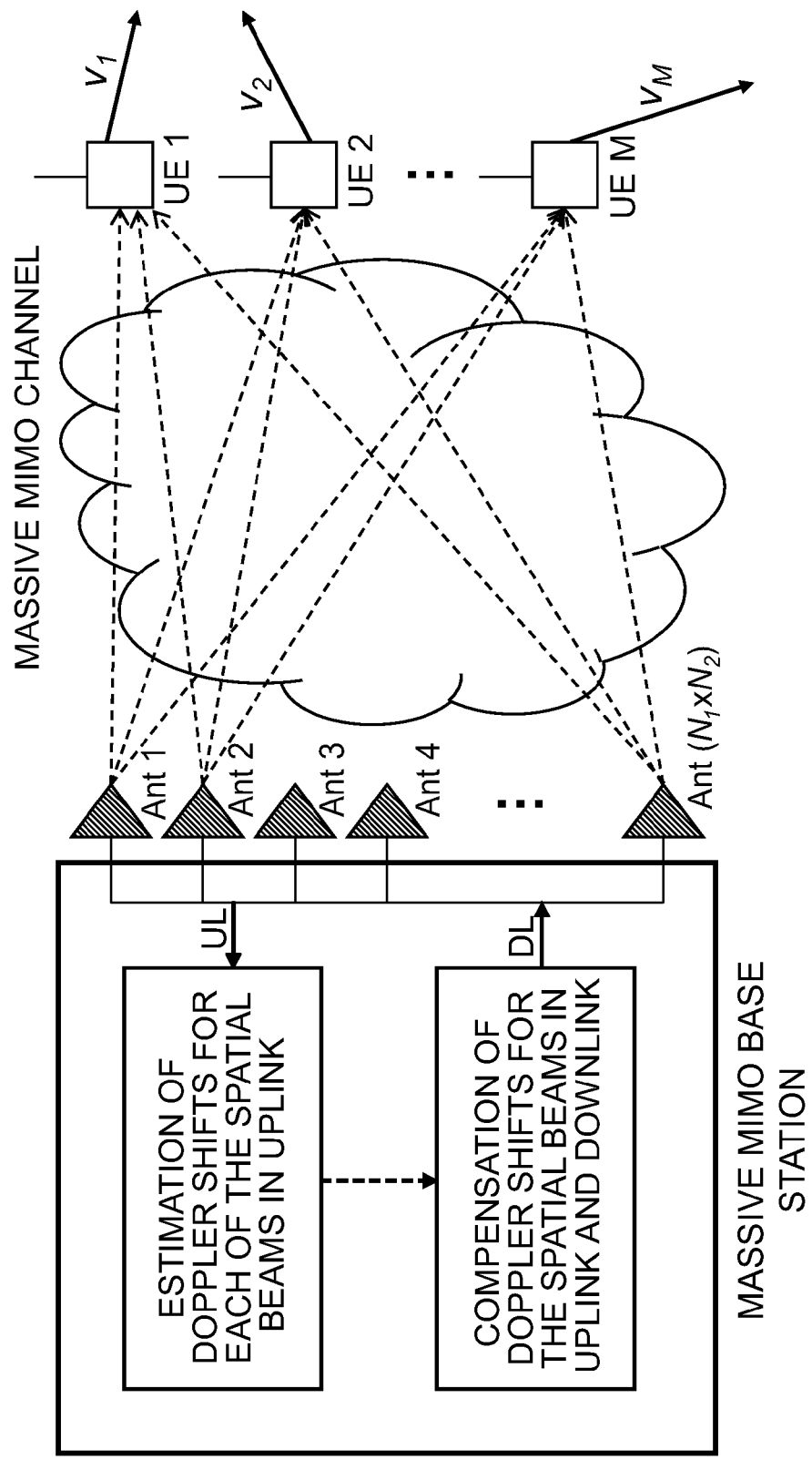
FIG. 1 shows a schematic block diagram of the proposed disclosure in a basic scenario with M users and a massive MIMO base station.

FIG. 1 summarizes the basics of the proposed disclosure. A number M of moving cellular user equipments (moving at velocities $v_1 \ldots v_M$) are wirelessly connected to a base station, comprising a rectangular array of $N_1 \times N_2$ transmission/reception antennas in a massive MIMO system (with multipath wireless channels), where $N_1$ and $N_2$ are the amount of antennas in the horizontal and vertical direction, respectively. User mobility leads to the appearance of a certain Doppler power spectrum at the receive side, whose impact depends on the magnitude of the user's velocity and its relative orientation with respect to the angles of departure or arrival, impairing reception in both uplink and downlink directions. The present disclosure compensates said Doppler impairments by estimating Doppler shifts for each of the spatial beams in uplink and compensating said estimated Doppler shifts in uplink and downlink.

Figure 2:
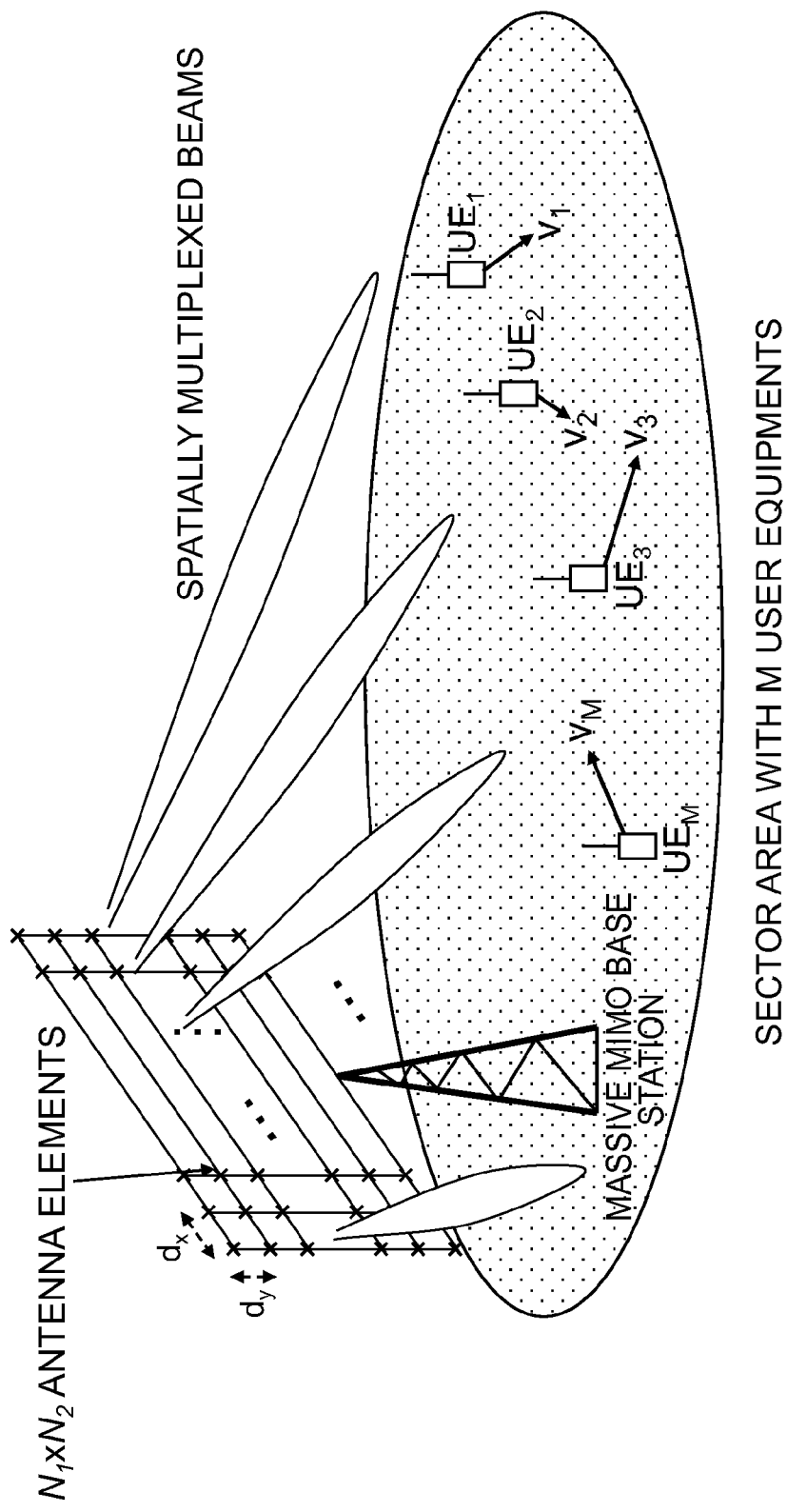
FIG. 2 shows a schematic diagram of a basic scenario for application of the disclosure according to an embodiment of the disclosure.

FIG. 2 illustrates the basic scenario and network deployment where the proposed method would apply, comprising a MIMO base station (BS), preferably a so-called massive MIMO base station, with a rectangular antenna array of $N_1 \times N_2$ antenna elements, with inter-antenna spacing given by $d_x$, $d_y$ in the horizontal and vertical dimensions, respectively. M cellular user equipments are simultaneously connected to the base station and their mobility is described by the velocity vectors $v_1 \ldots v_M$, which create Doppler impairments in both uplink (UL) and downlink (DL). The aim of this disclosure is to compensate Doppler effects at the BS side so that performance is optimized, while keeping baseband processing at the device side as simple as possible.

Massive MIMO systems are characterized by having at least one order of magnitude higher number of antennas at the BS compared to traditional MIMO systems (see for example, T. L. Marzetta, "Noncooperative Cellular Wireless with Unlimited Numbers of Base Station Antennas", IEEE Transactions on Wireless Communications, vol. 9 no. 11, November 2010 or L. Lu, G. Y. Li, A. L. Swindlehurst, A. Ashikhmin and R. Zhang, "An Overview of Massive MIMO: Benefits and Challenges," in IEEE Journal of Selected Topics in Signal Processing, vol. 8, no. 5, pp. 742-758, October 2014). The additional degrees of freedom brought by the excess antennas can be exploited in two ways:

Upon reception, the high number of antennas makes it possible for the base station (BS) to spatially discriminate the signals coming from multiple users by means of simple linear techniques.

Upon transmission, linear precoding techniques can easily be applied so as to spatially multiplex transmissions towards the different users, provided that full channel state information (CSI) is available at the BS.

The above properties make massive MIMO an ideal choice for increasing the area spectral efficiency of wireless cellular systems without further densifying the network. An important condition, though, is that the BS must have detailed CSI knowledge between each pair (antenna-user equipment) in both UL and DL. UL CSI can be easily achieved by means of pilots inserted as part of the uplink transmissions. However, DL CSI is in general only known by the user equipment unless the same frequencies are employed in UL and DL (and channel reciprocity holds). For this reason, massive MIMO systems based on full CSI are actually restricted to TDD operation. This proposal however is not restricted to TDD operation, and FDD can be supported without any channel reciprocity constraint. In a way, it can be said that the present disclosure stems from the disclosures described in patent applications EP-A1-2806576 and EP-A1-3038270 for spatially multiplexing users using orthogonal beams.

Spatial Multiplexing of User Equipments by Means of Orthogonal Beams

According to EP-A1-3038270 it is possible to spatially multiplex users in the DL without having detailed channel knowledge at the BS side. UL signals from users are assumed to be periodically received by the BS, for carrying either UL data or UL control pilots. Such UL signals contain enough information on the angles of arrival that can be re-used for the downlink. Reciprocity is observed between the angles of arrival and departure even if different frequencies are involved, apart from a usually small correction factor applied to the antenna excitations that accounts for the differences in UL and DL carrier frequencies. Hence, it is possible to derive the angular profile of user equipment i in UL as the set of directions (or beams (k, l)) in the (u, v) grid leading to non-zero received powers (signal energy):

$\Phi_i = \{(k_j, l_j), \forall j=0, \ldots, N_1 N_2 -1 \text{ such that non-null signal is received by user } i\}$, where i=0, ..., M−1, and the indices $(k_j, l_j)$ relate to the discretized directional cosines which are functions of the elevation and azimuth angles $(\theta, \varphi)$ in a spherical coordinate system, discretized trough a grid spacing as follows:

$u = \sin(\theta)\cos(\varphi)$ $v = \sin(\theta)\sin(\varphi)$

A sector area is fully covered by a set of $N_1 \times N_2$ discrete points in the (u, v) grid given by:

$u_k = k \cdot \Delta u; k=0,1, \ldots, N_1 -1$ $v_l = l \cdot \Delta v; l=0,1, \ldots, N_2 -1$ The sampling periods $\Delta u, \Delta v$ represent the desired granularity in the spatial domain and are related to the antenna spacing in both dimensions of the array $d_x, d_y$ that ensure orthogonality between the users (orthogonal multiple access):

$$d_x = \frac{\lambda}{N_1 \Delta u}$$

$$d_y = \frac{\lambda}{N_2 \Delta v}.$$

For this k=0, ..., $N_1$−1, l=0, ..., $N_2$−1 are indices characterising the beams (spatial beams) in an (u, v) grid with wavelength $\lambda$ according to the following relations:

$$u_k = k \cdot \Delta u,$$

$$v_l = l \cdot \Delta v,$$

$$\Delta u = \frac{\lambda}{N_1 d_x},$$

$$\Delta v = \frac{\lambda}{N_2 d_y}.$$

The angular profile $\Phi_i$ of each user equipment characterizes said user equipment uplink communications as it represents the set of angular directions (corresponding to the received multipaths) in which significant signal energy (or at least non-zero signal energy) is detected at the BS. The angular directions defined by the (u, v) grid can be regarded as a set of orthogonal beams. If multiple users are present and their corresponding angular profiles do not overlap in the (u, v) grid, it is possible to spatially multiplex their transmissions by performing the following precoding operation (according to the technique proposed in patent applications EP-A1-2806576 or EP-A1-3038270 but any known technique can be used to spatially separate the received beams):

$$A_T[n, m, f] = \sqrt{\frac{1}{N_1 N_2}} \sum_{k=0}^{N_1-1} \sum_{l=0}^{N_2-1} P_T[k, l] S_T[k, l, f] \exp\left(-j\frac{2\pi}{N_1}nk\right)\exp\left(-j\frac{2\pi}{N_2}ml\right),$$

$$\text{with } \begin{cases} n = 0, \ldots, N_1 - 1 \\ m = 0, \ldots, N_2 - 1 \\ f = 0, \ldots, N_c - 1 \end{cases}.$$

The information to be sent to each user is constructed as follows:

$$S_T[k, l, f] = \begin{cases} S_i[f]; \forall (k, l) \in \Phi_i, i = 0, 1, \ldots, M-1 \\ 0; \text{otherwise} \end{cases},$$

where $A_T[n, m, f]$ are the frequency-domain OFDM transmission signals corresponding to each antenna element (n, m) (this corresponds to the combined signal containing all the user equipments' information, as different user equipments will be addressed by means of different subsets of points in the u, v grid); $N_c$ denotes the number of subcarriers in the frequency domain; $P_T[k, l]$ are the individual transmit powers assigned to the orthogonal beams; $S_i[f]$ are the normalized (unit power) complex baseband signals corresponding to user equipment i in the frequency domain (or in other words, the frequency-domain signal for user equipment i). When no inter-user interference is present one can multiplex and de-multiplex users according to their angular profiles $\Phi_i$ without ambiguity.

For detection of uplink signals, after receiving the time-domain signals $A_R[n, m, t]$, $t=0, \ldots, N_c-1$, at antenna elements (n, m), the frequency contents of each beam at direction (k, l) can be obtained through the expression:

$$S_R[k, l, f] = \frac{1}{\sqrt{N_c N_1 N_2}}$$

$$\sum_{t=0}^{N_c-1} \sum_{n=0}^{N_1-1} \sum_{m=0}^{N_2-1} A_R[n, m, t] \exp\left(-j\frac{2\pi}{N_c}ft\right) \exp\left(j\frac{2\pi}{N_1}nk\right) \exp\left(j\frac{2\pi}{N_2}ml\right)$$

By knowing the frequency contents (or components) or each beam, it is apparent that the angular profile (the set of beams from which the power received from each user equipment is significant or at least is not zero) can be determined.

Figure 3:
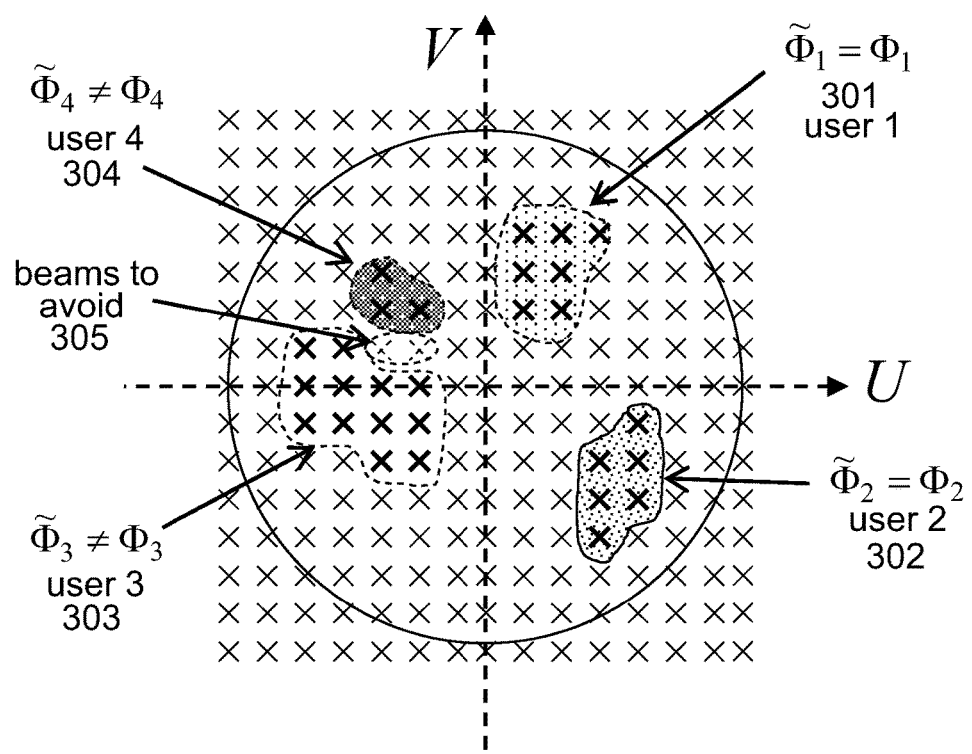
FIG. 3 illustrates some exemplary angular profiles where inter-user interference is avoided by not exciting common beams.

When multiple user equipments are present in the system, chances are that inter-user interference appears in urban environments as a result from reflections, diffraction and scattering. After obtaining the angular profiles $\Phi_i$ for all active users in the system, it is possible for the BS to infer which beams are "shared" by several users, i.e. which beams are simultaneously received by (or transmitted from) two or more users hence causing inter-user interference. As illustrated in FIG. 3 (which shows angular profiles of four exemplary users where inter-user interference is avoided by not exciting common beams), shared beams are those contained in the intersection of the angular profiles corresponding to two or more user equipments. It is then possible to avoid inter-user interference by defining new sets of directions (beams) $\tilde{\Phi}_i$, $i=0, \ldots, M'-1$ from $\Phi_i$ after excluding those shared beams:

$$\tilde{\Phi}_i = \{(k_j, l_j) \in \Phi_i : (k_j, l_j) \notin \Phi_{i'}, \forall i' \neq i\}, i=0, \ldots M'-1.$$

M' denotes the number of different resulting clusters (equal to the number of resolvable user equipments not suffering complete inter-user interference). The combined set of all beams contained in $\tilde{\Phi}_i$, defines the angular directions where transmission from the BS takes place:

$$\tilde{\Phi} \equiv \bigcup_{i=0}^{M'-1} \tilde{\Phi}_i.$$

As an example, in FIG. 3 the angular profiles of user (user equipment) 3 (303) and user (user equipment) 4 (304) are disjoint after avoiding two shared beams (305), while the angular profiles of user (user equipment) 1 (301) and user (user equipment) 2 (302) remain unchanged as they were already disjoint.

Doppler Spectrum of the Signals Captured by the Spatial Beams, and Compensation of the Doppler Impairments of the Signals Corresponding to the Spatial Beams The described spatial multiplexing technique allows convenient separation of the users in the spatial domain. Signals received in the uplink direction can be examined in the spatial domain by obtaining the time/frequency components of the beams in the spatial directions (k, l), which characterize the users (the user equipments) according to their "modified" angular profiles $\tilde{\Phi}_i$ (avoiding inter-user experience). Each of the beams represents a well-defined direction in space, with a certain beam width that can be obtained by taking derivatives thus yielding the following expressions:

$$\Delta \theta \cong \frac{u\Delta u + v\Delta v}{\sqrt{(u^2 + v^2)(1 - u^2 - v^2)}},$$

$$\Delta \varphi \cong \frac{u\Delta v - v\Delta u}{u^2 + v^2}.$$

By choosing half-lambda antenna separation, we have $$d_x = \frac{\lambda}{2} \Rightarrow \Delta u = \frac{2}{N_1},$$

$$d_y = \frac{\lambda}{2} \Rightarrow \Delta v = \frac{2}{N_2},$$

hence, denoting $r=\sqrt{u^2+v^2} \leq 1$ as the magnitude of the vector (u, v) in the spatial domain, we have:

$$\Delta \theta \cong \frac{2}{r\sqrt{1-r^2}}\left(\frac{u}{N_1} + \frac{v}{N_2}\right),$$

$$\Delta \varphi \cong \frac{2}{r^2}\left(\frac{u}{N_2} - \frac{v}{N_1}\right).$$

The equations are only approximate because $\Delta u$ and $\Delta v$ are actually finite. The equalities only hold when $\Delta u, \Delta v \to 0$: in fact, $\Delta \varphi$ vanishes at the points u=v which is unrealistic and means actually that the horizontal beam width is the smallest possible at these points.

Figure 4:
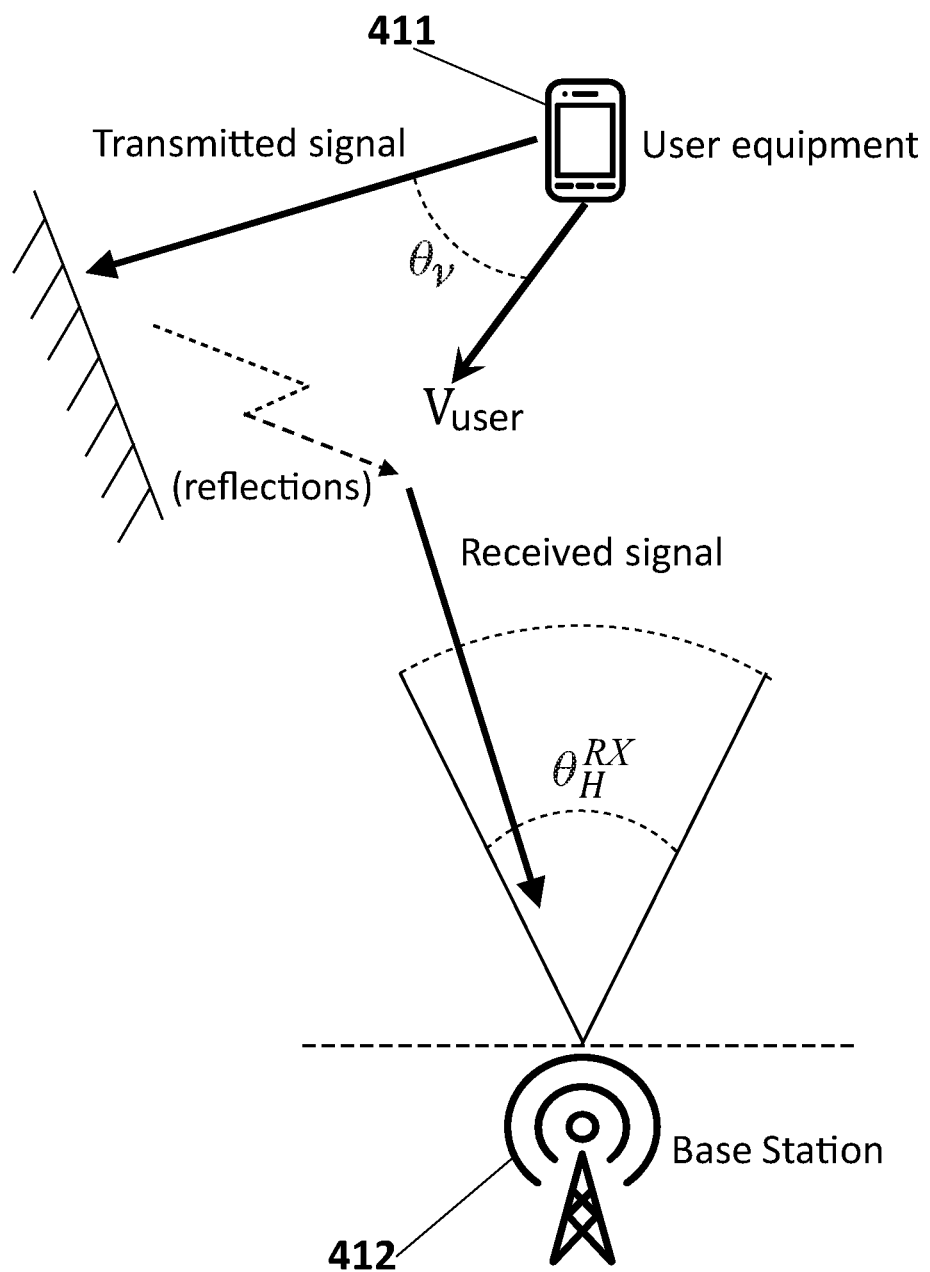
FIG. 4 illustrates a geometric characterization of the receive beam width $\theta_H^{RX}$, the transmitted and received signals, and the angle between the velocity vector and the transmitted signal $\theta_v$, taking uplink direction as a reference.

It is apparent that the beam widths are inversely proportional to the numbers of antennas $N_1$, $N_2$. Very small beam widths can be assumed if sufficiently large numbers of antennas are considered in both dimensions. Under these conditions, the Doppler power spectrum of a signal contained in a given beam does not follow the classical "U-shaped" Jakes spectrum, but resembles instead a pure Doppler shift. Taking the scenario in FIG. 4 as an exemplary reference in UL, a user equipment (411) moves at a relative velocity ($v_{user}$) with respect to the direction of departure of a given ray, which after reflection, diffraction and scattering is finally captured by the base station (412). The angle between the velocity vector and the direction of departure of the ray is $\theta_v$, and the receive beam width is $\theta_H^{RX}$. In general $\theta_H^{RX}$ will be equal to $\Delta\theta$, $\Delta\varphi$ or something in between depending on the plane formed by the received signal and the beam's rotational axis.

If the receive beam width is sufficiently small, then the Doppler shift $f_{d,shift}$ and Doppler spread $\Delta f_d$ values can be well approximated by the following expressions (as stated for example in the document "On the Impact of Beamforming in the Doppler Spectrum of Millimeter Wave Communications", submitted to *IEEE Communications Letters*, July 2016 by J. Lorca, M. Hunukumbure, and Y. Wang):

In the region $|\theta_v| \leq \frac{\theta_H^{RX}}{2}$ then $$f_{d,shift} = f_D\left(1 - \frac{\theta_H^{RX}|\theta_v|}{4}\right), \Delta f_d = f_D\frac{\theta_H^{RX}}{2}|\theta_v|$$

In the region $\frac{\theta_H^{RX}}{2} < |\theta_v| \leq \pi - \frac{\theta_H^{RX}}{2}$ then $$f_{d,shift} = f_D\cos\theta_v, \Delta f_d = f_D\theta_H^{RX}|\sin\theta_v|.$$

In the region $\pi - \frac{\theta_H^{RX}}{2} < |\theta_v| \leq \pi$ then $$f_{d,shift} = -f_D\left(1 - \frac{\theta_H^{RX}|\pi - \theta_v|}{4}\right), \Delta f_d = f_D\frac{\theta_H^{RX}}{2}|\pi - \theta_v|.$$

The resulting Doppler spread values are therefore proportional to the receive beam width $\theta_H^{RX}$. Hence for very small values of $\theta_H^{RX}$ the Doppler spectrum resembles a Doppler shift with a magnitude that depends on the magnitude of the velocity vector and its relative orientation with respect to the angle of departure. By virtue of reciprocity, all these expressions remain valid for DL direction by simply changing the roles of the transmitter and the receiver.

Taking the above expressions into account, it is easy for the base station to estimate the Doppler shifts of each of the beams contained in the angular profile of a given user equipment, because said Doppler shifts are seen as complex exponential terms multiplying the received OFDM signals in the time domain. If $S_{R,Dopp}[k, l, t]$ denotes the Doppler-affected discrete-time samples of the received OFDM symbols at the BS (in the spatial direction $(k, l)$), and $S_R[k, l, t]$ are the corresponding samples without Doppler impairments, it can be written:

$$S_{R,Dopp}[k,l,t] = S_R[k,l,t]\exp j2\pi(f_{d,shift}[k,l]/\Delta f)t,$$

where $\Delta f$ is the subcarrier width, $f_{d,shift}[k, l]$ is the Doppler shift in the spatial direction $(k, l)$ in the $(u, v)$ grid and $S_{R,Dopp}[k, l, t]$ can be obtained as:

$$S_{R,Dopp}[k, l, t] = \frac{1}{\sqrt{N_1 N_2}} \sum_{n=0}^{N_1-1} \sum_{m=0}^{N_2-1} A_R[n, m, t]\exp\left(j\frac{2\pi}{N_1}nk\right)\exp\left(j\frac{2\pi}{N_2}ml\right),$$

where $A_R[n, m, t]$ are the time domain signals received at the antenna element $(n, m)$.

The Doppler shift $f_{d,shift}[k, l]$ will be seen in the frequency domain as the superposition of two components: a coarse Doppler shift $f_{d,shift}^{coarse}[k, l]$, comprising an integer multiple of the subcarrier width (possibly zero), $$f_{d,shift}^{coarse}[k, l] = \left\lfloor\frac{f_{d,shift}[k, l]}{\Delta f}\right\rfloor \Delta f,$$

(where $\lfloor \cdot \rfloor$ represents the rounding towards zero operator), and a fine Doppler shift $f_{d,shift}^{fine}[k, l]$, comprising a fraction of a subcarrier width, $$f_{d,shift}^{fine}[k,l] = f_{d,shift}[k,l] - f_{d,shift}^{coarse}[k,l].$$

The total Doppler shift $f_{d,shift}[k, l] = f_{d,shift}^{coarse}[k, l] + f_{d,shift}^{fine}[k, l]$ can be estimated at the base station side. For example, it can be done by following a two-step approach. A-priori known pilot subcarriers can yield the coarse Doppler shift by identifying their relative shift in frequency upon reception. The fine Doppler shift can be obtained by means of known techniques (for example, the techniques explained in Schmid) and D. Cox, "Robust frequency and timing synchronization for OFDM", *IEEE Transactions on Consumer Electronics*, vol. 43, no. 3, pp. 776-783, August 1997 or in Van de Beek, M. Sandell, and P. O. Borjenson, "ML Estimation of Timing and Frequency Offset in OFDM Systems", *IEEE Transactions on Consumer Electronics*, vol. 42, no. 10, pp. 2908-2914, October 1994). Of course, any other known technique could be used.

After estimation of the Doppler shift $f_{d,shift}[k, l]$, it is possible to compensate Doppler in UL by a suitable processing of the received signals based on the estimated Doppler shifts, for example multiplying the signals received in spatial directions $(k, l)$, which are affected by the Doppler shifts $(S_{R,Dopp}[k, l, t])$, by a suitable time-domain complex factor:

$$S_R[k, l, t] = S_{R,Dopp}[k, l, t]\exp\left(-j2\pi\frac{f_{d,shift}[k, l]}{\Delta f}t\right).$$

In downlink, it is also possible to apply the following expression that yields the antenna excitations $A_T[n, m, t]$ (the time domain OFDM transmission signals corresponding to antenna $(n, m)$) in order to ideally compensate Doppler:

$$A_T[n, m, t] = \sqrt{\frac{1}{N_1 N_2}} \sum_{k=0}^{N_1-1} \sum_{l=0}^{N_2-1} P_T[k, l]S_T[k, l, t] \times$$
$$\exp\left(-j2\pi\frac{f_{d,shift}[k, l]}{\Delta f}t\right)\exp\left(-j\frac{2\pi}{N_1}nk\right)\exp\left(-j\frac{2\pi}{N_2}ml\right),$$

where $S_T[k, l, t]$ is the time-domain OFDM transmit signal corresponding to the spatial beam with coordinates $(k, l)$ in the $(u, v)$ grid (the spatial beams for downlink and uplink may be considered to be the same, as they correspond to physical directions in space and the grid definition depends on the wavelength $(\lambda)$ corresponding to the system operating frequency, which is very close in UL and DL) and $f_{d,shift}[k, l]$ is the estimated Doppler shift of the beam characterized by coordinates $(k, l)$ in the $(u, v)$ grid.

Hence, in this disclosure, and contrary to prior art techniques, the Doppler spectrum of the whole received signal (comprising the superposition of multiple components) is not compensated. Instead, individual beams characterizing the users (the user equipments) are isolated by exploiting the spatial multiplexing capabilities of massive MIMO and the properties of the Doppler spectrum in presence of beamforming. By applying the described disclosure, the constituent beams can reach the users in DL with ideally no Doppler impairments. Similarly in UL the signals corresponding to the different spatial beams are detected and their Doppler impairments compensated.

Figure 5:
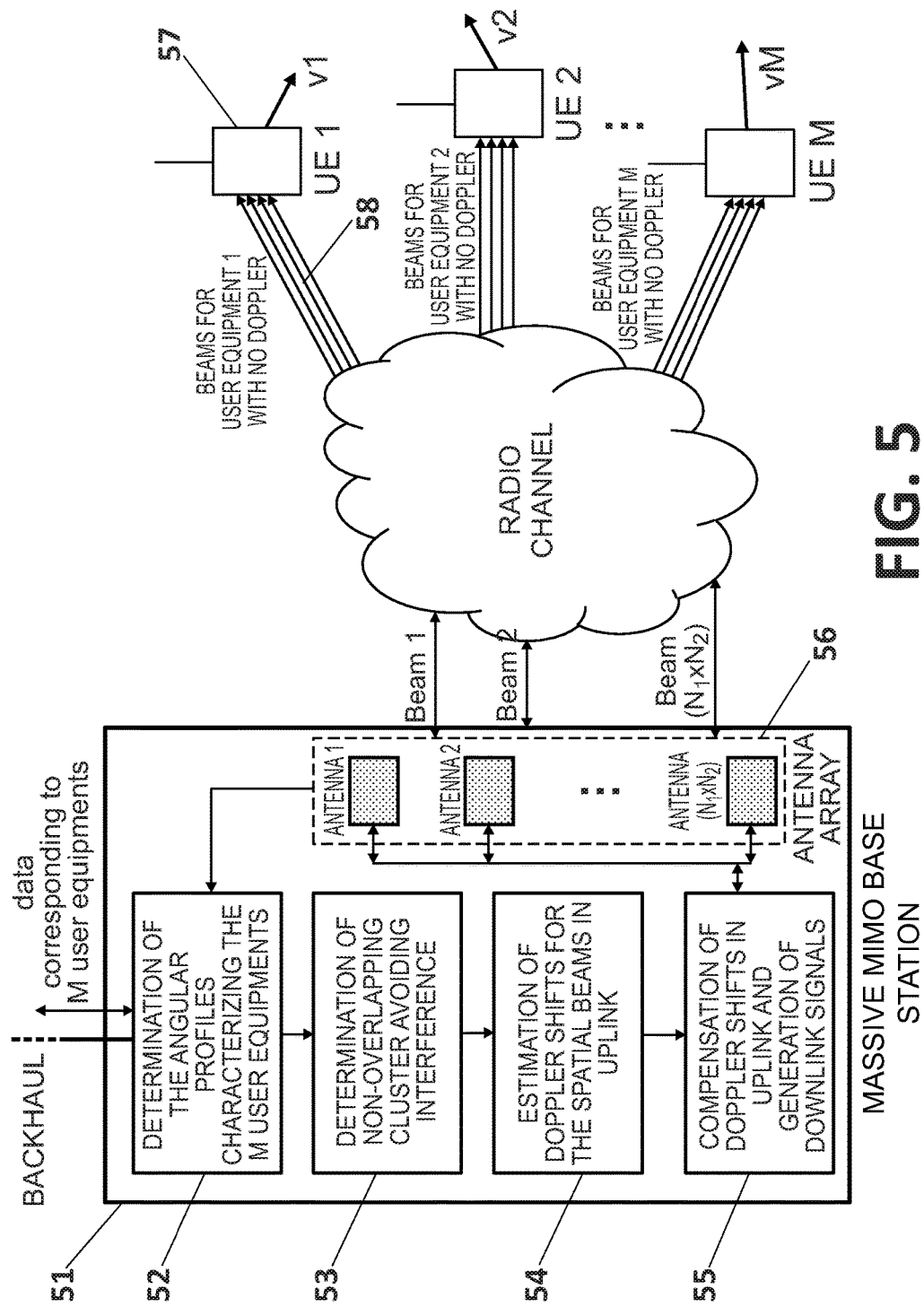
FIG. 5 shows a schematic block diagram of the proposed disclosure according to an embodiment of the disclosure.

Once the different processes have been described, an example of a mode of operation will be described below according to one embodiment of the disclosure to aid in clarifying the complete process. FIG. 5 illustrates an exemplary embodiment for application of the proposed disclosure.

In this embodiment, a MIMO base station (51) (preferably a massive MIMO base station) comprises a rectangular array of $N_1 \times N_2$ transmit/receive antennas (56), and M user equipments (57) are wirelessly connected exhibiting user velocities $v_1, v_2, \ldots, v_M$ respectively. The user equipments (UE) may be mobile phones, smartphones, laptops, tablets . . . and generally speaking any electronic device which can be wirelessly connected to the base station, allowing the user to communicate through the telecommunications network to which the base station belongs.

The massive MIMO base station is capable of spatially multiplexing up to $N_1 \times N_2$ orthogonal beams aimed at the M user equipments. Signals received in UL by the antenna array (56) are first processed (52) so as to determine a set of beams characterizing the uplink signals (communications) received from each user equipment (e.g angular profiles) $\{\Phi_i, i=0, \ldots, M-1\}$ for the M user equipments. This can be achieved e.g. with the aid of signatures or pilot sequences that can identify them unambiguously, but other techniques are not precluded. Optionally, any interfering beams may be identified and discarded from the angular profiles (53), hence yielding M' non-overlapping clusters $\{\tilde{\Phi}_i, i=0, \ldots, M'-1\}$. These steps (52, 53) may be done using the techniques proposed in patent applications EP-A1-2806576 or EP-A1-3038270, but other known techniques are not precluded.

The individual Doppler shifts corresponding to the spatial beams contained in $\{\tilde{\Phi}_i\}$ are estimated in the uplink (54), following the process previously explained. Doppler shifts in UL are compensated (55), and DL signals are generated by ideally compensating the estimated Doppler shifts (following the process previously explained). As a result, the beams (58) aimed towards each of the user equipments 1 . . . M (57) will exhibit no Doppler impairments at the device side (user equipment side).

Summarizing, the present disclosure proposes a novel technique to overcome the effects of mobility in OFDM wireless cellular networks. The spatial multiplexing capabilities of massive MIMO are exploited in order to decompose the signals received from, and transmitted to, a set of users into orthogonal spatial beams, in such a way that beams corresponding to each user are detected and inter-user interference is ideally avoided. The impact of Doppler within each spatial beam can be well approximated by a simple Doppler shift whenever the beam widths of the spatial beams are sufficiently small. Individual Doppler shifts can then be estimated in UL, and further compensated in UL and DL so that the combined signals do not suffer from any Doppler impairment.

The proposed disclosure can have great relevance in wireless cellular communications where Doppler effects are strong, either because user speeds are significant or because the carrier frequency is high (e.g. in millimeter-wave communications). Doppler effects in OFDM can limit performance to the point that no communication is possible beyond a given user speed. Moreover, Doppler exhibits a Doppler spread whenever the received signals are uniformly distributed in azimuth, hence being much more difficult to compensate at the receiver side. The proposed disclosure transforms Doppler spread into the superposition of multiple Doppler shifts at each of the spatial beams, which can be effectively compensated at the BS side. The proposed disclosure is applicable in both FDD and TDD as no detailed channel knowledge is required at the base station side.

In this text, for simplicity sometimes the terms user or cellular user are employed to refer to the concept of user equipment (also called user station or user device), that is the electronic device wirelessly connected to a base station in a wireless OFDM communications system which is employed by a user to communicate through the wireless OFDM communications system.

The present disclosure can be used in any type of OFDM communication system, especially in OFDM communication systems such as mobile (cellular) telecommunication networks, Long-Term Evolution (LTE) wireless cellular system, an IEEE 802.11, WiFi system, an IEEE 802.16, WiMAX (Wireless Microwave Access) system or any other type of OFDM communications system.

The proposed embodiments can be implemented by means of software elements, hardware elements, firmware elements, or any suitable combination of them.

Note that in this text, the term "comprises" and its derivations (such as "comprising", etc.) should not be understood in an excluding sense, that is, these terms should not be interpreted as excluding the possibility that what is described and defined may include further elements, steps, etc.

The matters defined in this detailed description are provided to assist in a comprehensive understanding of the disclosure. Accordingly, those of ordinary skill in the art will recognize that variation changes and modifications of the embodiments described herein can be made without departing from the scope of the disclosure. Also, description of well-known functions and elements are omitted for clarity and conciseness. Of course, the embodiments of the disclosure can be implemented in a variety of architectural platforms, operating and server systems, devices, systems, or applications. Any particular architectural layout or implementation presented herein is provided for purposes of illustration and comprehension only and is not intended to limit aspects of the disclosure.

What is claimed is:

1. A method for compensating Doppler impairments in a wireless Orthogonal Frequency-Division Multiplexing, OFDM, system comprising at least one base station equipped with a two-dimensional rectangular antenna array of $N_1 \times N_2$ antenna elements and M user equipments, M>=1, where the method comprises the following steps:

a) spatially separating the received beams corresponding to different user equipments from the signals received in the uplink by the antenna array, according to their angles of arrival, and determining a set of beams characterizing the user equipments;

b) estimating the Doppler shift corresponding to each beam of said set of beams characterizing the user equipments; and c) processing the received signals in each beam of said set of beams characterizing the user equipments, to compensate Doppler impairments in uplink, based on the estimated Doppler shifts of each beam of said set of beams characterizing the user equipments; where this processing is made by applying the following expression:

$$S_R[k, l, t] = S_{R,Dopp}[k, l, t] \exp\left(-j2\pi \frac{f_{d,shift}[k, l]}{\Delta f} t\right),$$

where $S_{R,Dopp}[k, l, t]$ denotes the Doppler-affected discrete-time samples of the received OFDM symbol at the base station, at the uplink beam characterized by coordinates (k, l), $S_R[k, l, t]$ are the corresponding samples of the received OFDM symbol at the base station after introducing said intentional Doppler shift in the beam characterized by coordinates (k, l); $\Delta f$ is the subcarrier width; and $f_{d,shift}[k,l]$ is the estimated Doppler shift of the uplink beam characterized by coordinates (k, l).

2. A method according to claim 1, where the base station comprises $N_1$ antenna elements along a perpendicular axis with a regular spacing $d_x$ and $N_2$ antenna elements along a perpendicular axis with a regular spacing $d_y$, and where the position of said user equipments is defined by elevation and azimuth angles $(\theta, \varphi)$ in a spherical coordinate system discretized trough a grid spacing $\Delta u$, $\Delta v$ in an (u, v) domain where $$u = \sin(\theta)\cos(\varphi)$$

$$v = \sin(\theta)\sin(\varphi)$$

and where (k, l) are indices characterising beams in an (u, v) grid according to the following relations:

$$u_k = k \cdot \Delta u; k = 0, 1, \ldots, N_1 - 1$$
$$v_l = l \cdot \Delta v; l = 0, 1, \ldots, N_2 - 1$$
$$d_x = \frac{\lambda}{N_1 \Delta u}$$
$$d_y = \frac{\lambda}{N_2 \Delta v}.$$

where $\lambda$ is the wavelength of a system operating frequency.

3. A method according to claim 1 where the method further comprises:
d) spatially decomposing the signals to be transmitted by the base station into individual beams in downlink direction;
e) introducing, in each beam of the set of beams characterizing the user equipments for the signal to be transmitted in downlink direction, a shift equal to the opposite of the estimated Doppler shift for said beam in step b) in order to compensate Doppler impairments in downlink.

4. A method according to claim 3 where step e) includes: obtaining the time-domain OFDM transmit signals $A_T[n, m, t]$ corresponding to antenna element (n, m), which compensate Doppler impairments in downlink, by applying the following expression:

$$A_T[n, m, t] = \sqrt{\frac{1}{N_1 N_2}} \sum_{k=0}^{N_1-1} \sum_{l=0}^{N_2-1} P_T[k, l] S_T[k, l, t] \times$$
$$\exp\left(-j2\pi \frac{f_{d,shift}[k, l]}{\Delta f} t\right) \exp\left(-j\frac{2\pi}{N_1}nk\right) \exp\left(-j\frac{2\pi}{N_2}ml\right),$$

where $\Delta f$ is a subcarrier width; $S_T[k, l, t]$ is the time-domain OFDM transmission signal corresponding to the beam with coordinates (k, l) in the (u, v) grid; $P_T[k,l]$ are the individual transmit powers assigned to the beam with coordinates (k, l); and $f_{d,shift}[k,l]$ is the Doppler shift of the beam with coordinates (k, l) as estimated in step b).

5. A method according to claim 3, where the signals to be transmitted in downlink direction are decomposed into individual beams by means of the following expression:

$$A_T[n, m, f] = \sqrt{\frac{1}{N_1 N_2}}$$
$$\sum_{k=0}^{N_1-1} \sum_{l=0}^{N_2-1} P_T[k, l] S_T[k, l, f] \exp\left(-j\frac{2\pi}{N_1}nk\right) \exp\left(-j\frac{2\pi}{N_2}ml\right),$$
with $f = 0, \ldots, N_c - 1$, where $A_T[n, m, f]$ are the frequency-domain OFDM transmit signals corresponding to each antenna element (n, m); $P_T[k,l]$ are the individual transmit powers assigned to beam with coordinates (k, l); and $S_T[k, l, f]$ are the normalized complex baseband signals to be transmitted over the beam with coordinates (k, l).

6. A method according to claim 1 where $S_{R,Dopp}[k, l, t]$ is given by the following expression:

$$S_{R,Dopp}[k, l, t] = \frac{1}{\sqrt{N_1 N_2}} \sum_{n=0}^{N_1-1} \sum_{m=0}^{N_2-1} A_R[n, m, t] \exp\left(j\frac{2\pi}{N_1}nk\right) \exp\left(j\frac{2\pi}{N_2}ml\right)$$

where $A_R[n, m, t]$ are the uplink time-domain signals received at the antenna element (n, m), where n and m are integer indices labeling the antenna in the horizontal and vertical directions respectively.

7. A method according to claim 3 where in step d) the individual beams into which the signals to be transmitted in downlink direction are decomposed are the beams of the set of individual beams characterizing the user equipments as determined in step a).

8. A method according to claim 1, where step a) comprises obtaining the frequency components $S_R[k, l, f]$ of the signals received from the M user equipments in the uplink by applying the following transformation over the received time-domain signals $A_R[n, m, t]$ received at the antenna element (n, m), where n and m are integer indices labeling the antenna in the horizontal and vertical directions respectively, at the spatial beam in the (k, l) direction:

$$S_R[k, l, f] = \frac{1}{\sqrt{N_c N_1 N_2}}$$
$$\sum_{t=0}^{N_c-1} \sum_{n=0}^{N_1-1} \sum_{m=0}^{N_2-1} A_R[n, m, t] \exp\left(-j\frac{2\pi}{N_c}ft\right) \exp\left(j\frac{2\pi}{N_1}nk\right) \exp\left(j\frac{2\pi}{N_2}ml\right)$$

where $N_c$ is the number of subcarriers in the frequency domain.

9. A method according to claim 1, where step a) further comprises determining the set of beams characterizing the user equipments as the set of angular directions (k, l) at which the received powers from each of the user equipments are not zero.

10. A method according to claim 9, where in step a), from the set of beams characterizing the user equipments, those beams belonging to the set of beams of two or more different user equipments are discarded.

11. A method according to claim 1, where the steps of the method are performed by the base station.

12. A base station for compensating Doppler impairments comprising a two-dimensional rectangular antenna array of $N_1 \times N_2$ antenna elements, the base station being wirelessly connected through a wireless Orthogonal Frequency-Division Multiplexing, OFDM, network with M user equipments, M>=1, where the base station further comprises a processing unit configured to perform the following steps:
  a) spatially separating the received beams corresponding to different user equipments from the signals received in the uplink by the antenna array, according to their angles of arrival, and for each user equipment determining a set of received beams characterizing the user equipments;
  b) estimating the Doppler shift corresponding to each beam of said set of beams characterizing the user equipments;
  c) processing the received signals in each beam of said set of beams characterizing the user equipments to compensate Doppler impairments in uplink, based on the estimated Doppler shifts of each beam of said set of beams characterizing the user equipments; where this processing is made by applying the following expression:

$$S_R[k, l, t] = S_{R,Dopp}[k, l, t]\exp\left(-j2\pi \frac{f_{d,shift}[k, l]}{\Delta f}t\right),$$

where $S_{R,Dopp}[k, l, t]$ denotes the Doppler-affected discrete-time samples of the received OFDM symbol at the base station, at the uplink beam characterized by coordinates (k, l), $S_R[k, l, t]$ are the corresponding samples of the received OFDM symbol at the base station after introducing said intentional Doppler shift in the beam characterized by coordinates (k, l); $\Delta_f$ is the subcarrier width; and $f_{d,shift}[k,l]$ is the estimated Doppler shift of the uplink beam characterized by coordinates (k, l).

13. A system for compensating Doppler in wireless Orthogonal Frequency-Division Multiplexing, OFDM, networks, the system comprising M user equipments, M>=1 and a base station comprising a two-dimensional rectangular antenna array of $N_1 \times N_2$ antenna elements, and where the system further comprises a processing unit configured to perform the following steps:
  a) spatially separating the received beams corresponding to different user equipments from the signals received in the uplink by the antenna array, according to their angles of arrival, and for each user equipment, determining a set of beams characterizing the user equipments;
  b) estimating the Doppler shift corresponding to each beam of said set of beams characterizing the user equipments;
  c) processing the received signals in each beam of said set of beams characterizing the user equipments to compensate Doppler impairments in uplink, based on the estimated Doppler shifts of each beam of said set of beams characterizing the user equipments; where this processing is made by applying the following expression:

$$S_R[k, l, t] = S_{R,Dopp}[k, l, t]\exp\left(-j2\pi \frac{f_{d,shift}[k, l]}{\Delta f}t\right),$$

where $S_{R,Dopp}[k, l, t]$ denotes the Doppler-affected discrete-time samples of the received OFDM symbol at the base station, at the uplink beam characterized by coordinates (k, l), $S_R[k, l, t]$ are the corresponding samples of the received OFDM symbol at the base station after introducing said intentional Doppler shift in the beam characterized by coordinates (k, l); $\Delta_f$ is the subcarrier width; and $f_{d,shift}[k,l]$ is the estimated Doppler shift of the uplink beam characterized by coordinates (k, l).

14. A non-transitory computer readable medium comprising program code instructions which when loaded into a computer system controls the computer system to perform the method of claim 1.

* * * * *